(12) United States Patent
Griffin et al.

(10) Patent No.: US 8,159,834 B2
(45) Date of Patent: Apr. 17, 2012

(54) MAGNETIC HINGE ELECTRONIC MOBILE DEVICE

(75) Inventors: Jason Tyler Griffin, Kitchener (CA); Julia Allwright, London (GB); Martin Riddiford, London (GB); James Reeves, Twyford (GB)

(73) Assignee: Research in Motion Ltd., Waterloo, Ontario (CA)

( * ) Notice: Subject to any disclaimer, the term of this patent is extended or adjusted under 35 U.S.C. 154(b) by 311 days.

(21) Appl. No.: 12/623,003

(22) Filed: Nov. 20, 2009

(65) Prior Publication Data

US 2011/0122594 A1    May 26, 2011

(51) Int. Cl.
H05K 7/02  (2006.01)
H05K 7/04  (2006.01)

(52) U.S. Cl. .................. 361/810; 361/715; 361/800

(58) Field of Classification Search .............. 361/715, 361/807, 810, 728–730, 800; 455/550, 550.1, 455/575.1, 575.3; 16/385, 320
See application file for complete search history.

(56) References Cited

U.S. PATENT DOCUMENTS

| 3,707,017 | A | | 12/1972 | Paquette | |
|---|---|---|---|---|---|
| 5,274,882 | A | * | 1/1994 | Persson | 16/303 |
| 6,832,100 | B2 | * | 12/2004 | Hsieh | 455/550.1 |
| 6,950,316 | B2 | * | 9/2005 | Pan et al. | 361/814 |
| 7,016,492 | B2 | * | 3/2006 | Pan et al. | 379/433.13 |
| 7,337,497 | B2 | | 3/2008 | Seidler et al. | |
| 7,915,986 | B2 | * | 3/2011 | Lu | 335/285 |
| 2002/0147026 | A1 | | 10/2002 | Hsieh | |
| 2003/0179880 | A1 | | 9/2003 | Pan et al. | |
| 2007/0077972 | A1 | | 4/2007 | Tu et al. | |
| 2009/0167472 | A1 | | 7/2009 | Lu | |
| 2011/0211297 | A1 | * | 9/2011 | Griffin et al. | 361/679.01 |

OTHER PUBLICATIONS

Extended European Search Report and Opinion for EP 09176625.3, mailed Mar. 19, 2010.

* cited by examiner

*Primary Examiner* — Hung S Bui
(74) *Attorney, Agent, or Firm* — Quarles & Brady LLP

(57) ABSTRACT

An electronic mobile device comprises a base forming an inner surface and having a base hinge end. A cover having a cover hinge end is engaged with the base hinge end, and the cover is pivotable about a hinge axis that is substantially parallel to the inner surface of the base. The cover is movable from a closed position to an open position and vice versa relative to the base. In the closed position the cover is disposed proximate the base, and in the open position the cover is disposed away from the base. A base magnet having a first magnetic axis is supported at the base hinge end, and a cover magnet is supported at the cover hinge end so as to move with the cover relative to the base. The cover magnet has a second magnetic axis and interacts with the base magnet. Interaction of the base magnet and the cover magnet tends to align the first magnetic axis and the second magnetic axis and thereby bias the cover towards at least one of the closed position and the open position.

20 Claims, 8 Drawing Sheets

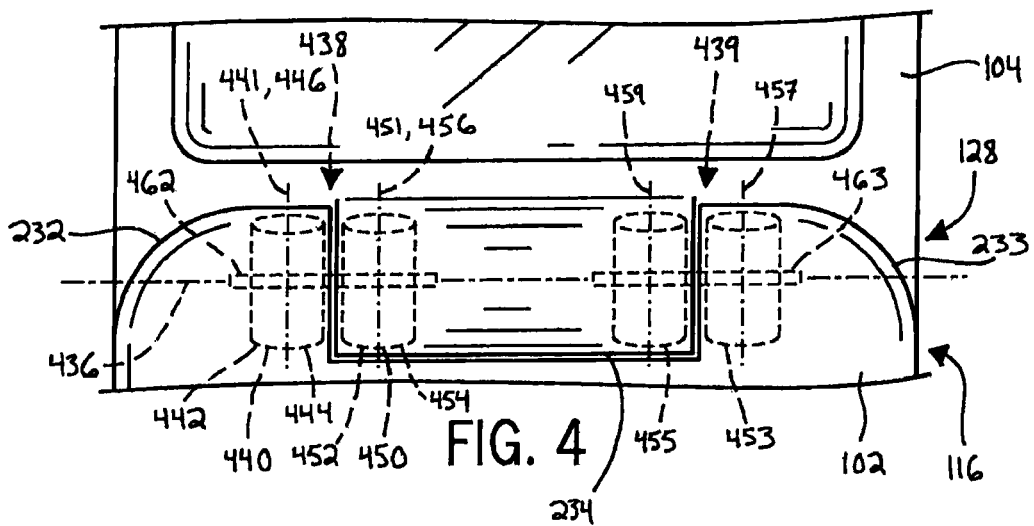
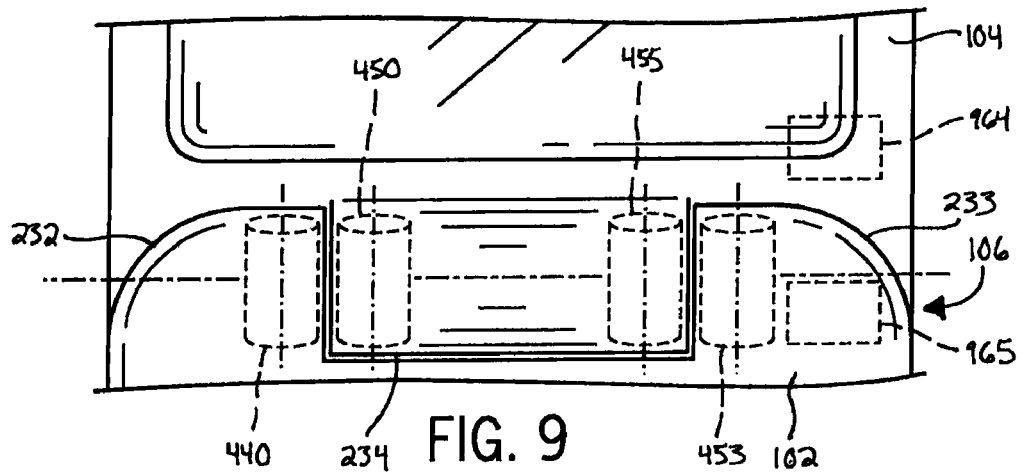
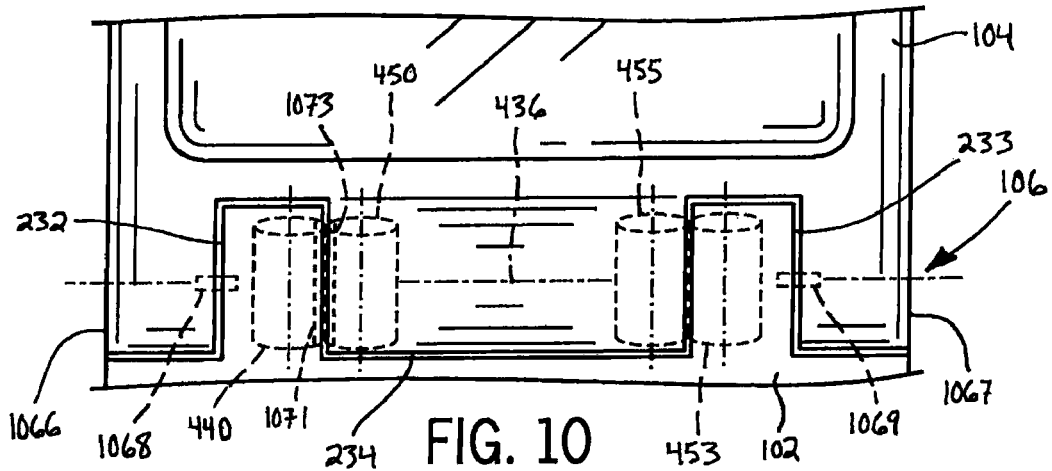

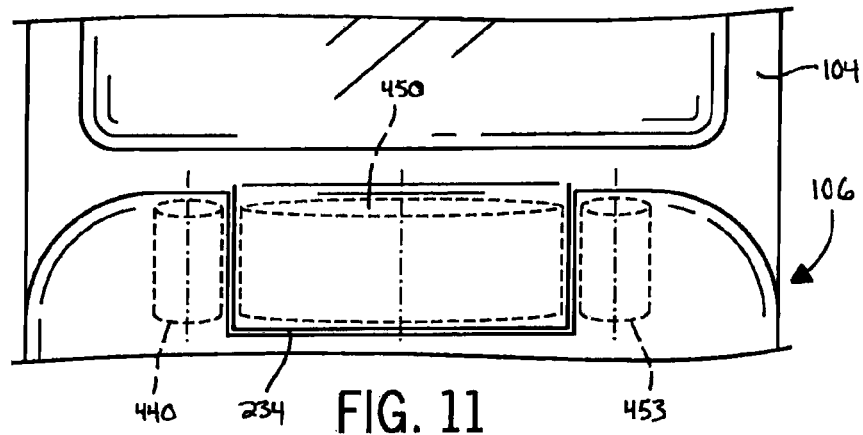
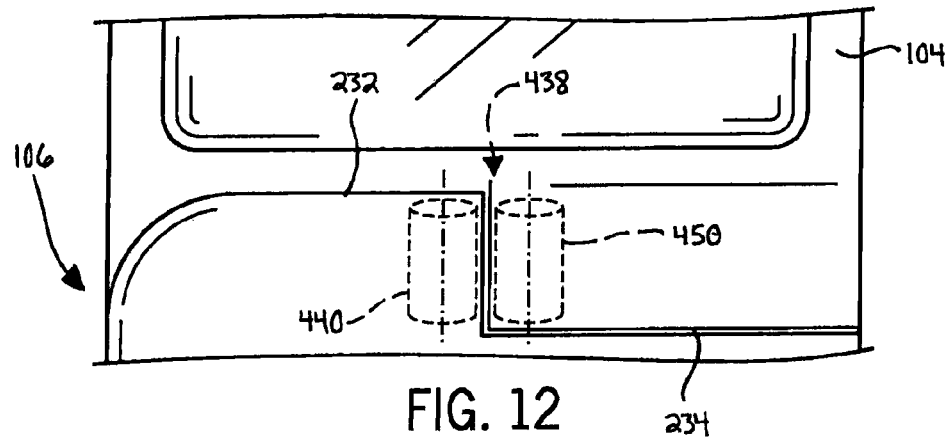
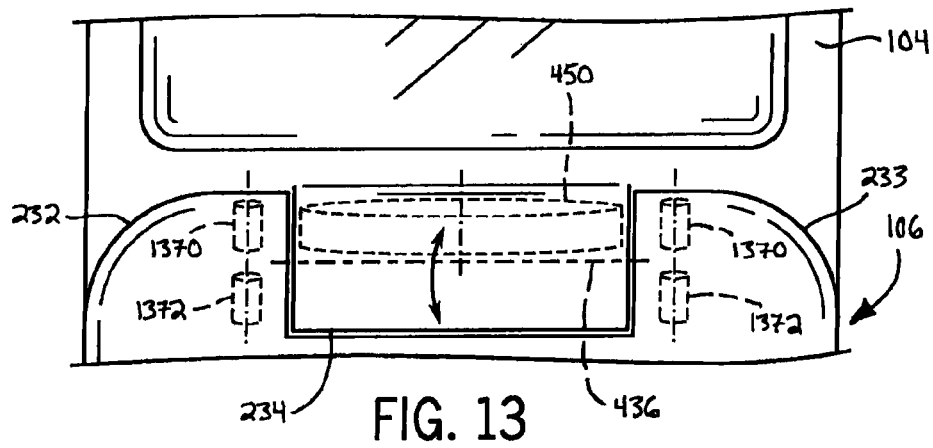

MAGNETIC HINGE ELECTRONIC MOBILE DEVICE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

This disclosure relates to electronic mobile devices. In particular, this disclosure relates to hinge structures for cellular phones.

Some types of electronic mobile devices such as cellular phones, personal digital assistants (PDAs), and the like include a "flip" or pivotable cover connected to a base. These flip devices are popular for various reasons; for example, a display is typically supported by the cover and a keypad or other input panel is supported by the base. Therefore, both the display and the keypad can be larger than those of similarly-sized non-flip devices that include a display and a keypad on a single surface. As another example, the cover closes against the keypad when the mobile device is not in use, thereby preventing unintentional selection of keypad buttons. Furthermore, moving the cover of some electronic mobile devices causes the device to perform different actions, such as answering calls, ending calls, or de-energizing a main display to enter a power-saving mode.

Most previous flip devices include a hinge structure to pivotally connect the cover and the base. The hinge includes a shaft that defines a hinge axis and supports one end of a compression spring. The other end of the spring engages a set of cams that pivot relative to one another about the hinge axis. A first cam is supported by the base, and a second cam is supported by the cover. The engaging surfaces of the cams are shaped such that the spring biases the cams to positions in which the cover is fully closed or fully open. That is, the spring and the engaging surfaces of the cams are designed such that the cover is forced away from partially open positions. As such, the hinge assists a user in both opening and closing the cover.

Unfortunately, the hinge may be worn out with repeated and frequent use. For example, the spring may deform and the characteristics of the spring may change due to compressive forces applied as the cover pivots. As such, the biasing force provided by the hinge may decrease over the life of the device. Furthermore, typical hinge structures are relatively tall compared to other components of electronic mobile devices and therefore, in many cases, flip devices cannot be made as thin as non-flip devices.

BRIEF DESCRIPTION OF THE DRAWINGS

The disclosure will hereafter be described with reference to the accompanying drawings, wherein like reference numerals denote like elements, and:

FIG. 4 is a top detail view of a hinge of the electronic mobile device of FIG. 1 in the open position;

FIG. 9 is a top detail view of a second embodiment of the hinge of the electronic mobile device;

FIG. 10 is a top detail view of a third embodiment of the hinge of the electronic mobile device;

FIG. 11 is a top detail view of a fourth embodiment of the hinge of the electronic mobile device;

FIG. 12 is a top detail view of a fifth embodiment of the hinge of the electronic mobile device;

FIG. 13 is a top detail view of a sixth embodiment of the hinge of the electronic mobile device;

DETAILED DESCRIPTION OF THE DRAWINGS

Figure 1:
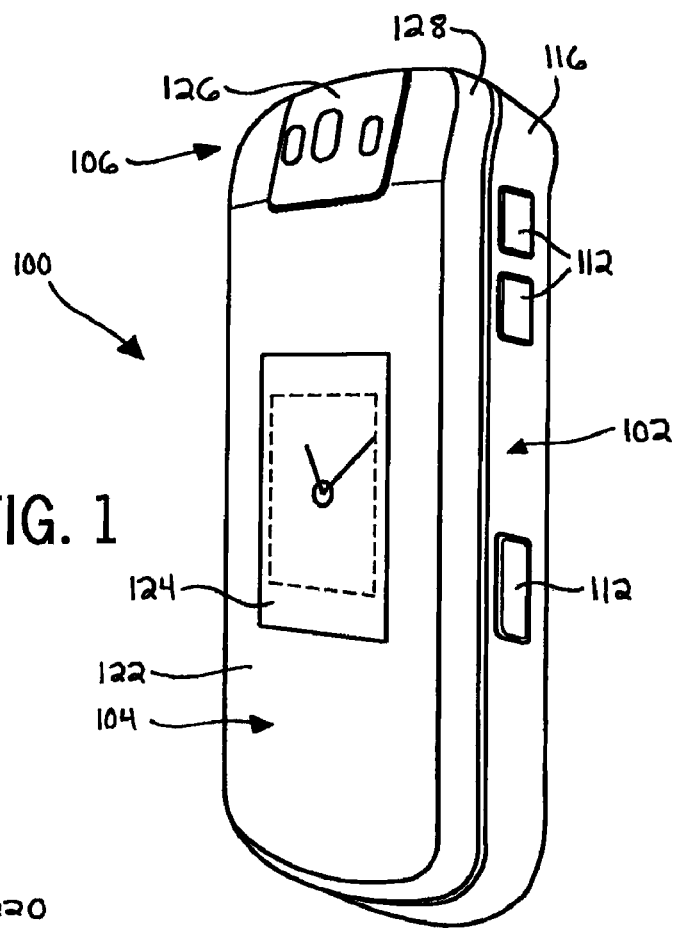
FIG. 1 is a perspective view of an electronic mobile device incorporating the present disclosure and having a cover shown in a closed position.

An electronic mobile device comprises a base forming an inner surface and having a base hinge end. A cover having a cover hinge end is engaged with the base hinge end, and the cover is pivotable about a hinge axis that is substantially parallel to the inner surface of the base. The cover is movable from a closed position to an open position and vice versa relative to the base. In the closed position the cover is disposed proximate the base, and in the open position the cover is disposed away from the base. A base magnet having a first magnetic axis is supported at the base hinge end, and a cover magnet is supported at the cover hinge end so as to move with the cover relative to the base. The cover magnet has a second magnetic axis and interacts with the base magnet. Interaction of the base magnet and the cover magnet tends to align the first magnetic axis and the second magnetic axis and thereby bias the cover towards at least one of the closed position and the open position.

The cover may be movable over a pivotal range between the open position and the closed position in which the first magnetic axis and the second magnetic axis are misaligned. In the closed position the first magnetic axis may also be misaligned with the second magnetic axis, and in the open position the first magnetic axis may be aligned with the second magnetic axis.

The cover may be detachable from the base in the open position.

The base magnet may be a diametric magnet that includes a north pole half, a south pole half, a polarity plane separating the north pole half and the south pole half, and an attraction plane perpendicular to the polarity plane. An intersection of the polarity plane and the attraction plane defines the first magnetic axis.

The base magnet and the cover magnet may be diametric magnets, and each of the diametric magnets include a north pole half, a south pole half, a polarity plane separating the north pole half and the south pole half, and an attraction plane perpendicular to the polarity plane. Interaction between the base magnet and the cover magnet tends to align the attraction planes and thereby bias the cover towards the at least one of the closed position and the open position.

The electronic mobile device may further comprise a second base magnet supported at the base hinge end. The second base magnet has a third magnetic axis. The device may also further comprise a second cover magnet supported at the cover hinge end so as to move with the cover relative to the base. The second cover magnet interacts with the second base magnet and has a fourth magnetic axis. Interaction between the second base magnet and the second cover magnet tends to align the third magnetic axis and the fourth magnetic axis and thereby bias the cover towards the at least one of the closed position and the open position.

The electronic mobile device may further comprise a second base magnet supported at the base hinge end. The second base magnet has a third magnetic axis. Interaction between the second base magnet and the cover magnet tends to align the second magnetic axis and the third magnetic axis and thereby bias the cover towards the at least one of the closed position and the open position.

An electronic mobile device comprises a base forming an inner surface. A cover is pivotable about a hinge axis that is substantially parallel to the inner surface of the base. The cover is movable from a closed position to an open position and vice versa relative to the base. In the closed position the cover is disposed proximate the base, and in the open position the cover is disposed away from the base. The device further comprises a hinge including a first base hinge knuckle fixedly supported by the base. A first magnet having a first magnetic axis is housed within the first base hinge knuckle. The hinge further includes a first cover hinge knuckle fixedly supported by the cover proximate the first base hinge knuckle. A second magnet having a second magnetic axis is housed within the first cover hinge knuckle so as to move together with the cover relative to the base. The first magnet and the second magnet interact to provide a tendency to align the first magnetic axis and the second magnetic axis and thereby bias the cover towards at least one of the closed position and the open position.

The electronic mobile device may further include a second base hinge knuckle fixedly supported by the base and a third magnet housed within the second base hinge knuckle. The third magnet has a third magnetic axis. The device may further include a second cover hinge knuckle fixedly supported by the cover proximate the second base hinge knuckle and a fourth magnet housed within the second cover hinge knuckle so as to move together with the cover relative to the base. The fourth magnet has a fourth magnetic axis. The fourth magnet and the third magnet interact to provide a tendency to align the fourth magnetic axis and the third magnetic axis and thereby bias the cover towards at least one of the closed position and the open position.

The device may further include a first hinge pin pivotally connecting the first base hinge knuckle and the first cover hinge knuckle, and a second hinge pin pivotally connecting the second base hinge knuckle and the second cover hinge knuckle.

The cover may be movable over a first pivotal range and a second pivotal range. When pivoted to a position in the first pivotal range the first magnet and the second magnet may bias the cover towards the closed position. When pivoted to a position in the second pivotal range the first magnet and the second magnet may bias the cover towards the open position.

The base may have a base longitudinal plane and the cover may have a cover longitudinal plane. The first magnetic axis may be misaligned relative to the base longitudinal plane, and the second magnetic axis may be generally parallel relative to the cover longitudinal plane.

The electronic mobile device may further comprise an input panel supported by the base and a display supported by the cover. The electronic mobile device may also further comprise a first wireless transceiver supported within the cover and a second wireless transceiver supported within the base. The second wireless transceiver and the first wireless transceiver communicate to operatively connect the input panel to the display.

The hinge may further include a second base hinge knuckle fixedly supported by the base. The first base hinge knuckle and the second base hinge knuckle may be disposed on opposite sides of the first cover hinge knuckle. The hinge may also further include a third magnet housed within the second base hinge knuckle. The third magnet has a third magnetic axis. The hinge may also further include a fourth magnet housed within the first cover hinge knuckle so as to move together with the cover relative to the base. The fourth magnet has a fourth magnetic axis. The third magnet and the fourth magnet interact to provide a tendency to align the third magnetic axis and the fourth magnetic axis and thereby bias the cover towards at least one of the closed position and the open position.

The hinge may further include a third magnet housed within the first base hinge knuckle. The third magnet has a third magnetic axis. The second magnet and the third magnet interact to provide a tendency to align the second magnetic axis and the third magnetic axis and thereby bias the cover towards the other of the closed position and the open position.

The electronic mobile device may further comprise an input panel supported by the base and a display supported by the cover. The first magnet may include a first electrical plating surface. The second magnet may include a second electrical plating surface electrically connected to the first electrical plating surface to operatively connect the input panel to the display.

An electronic mobile device comprises a base and an input panel supported by the base. A cover is pivotable from a closed position to an open position and vice versa relative to the base. In the closed position the cover covers the input panel, and in the open position the cover is disposed away from the base. A display is supported by the cover. A base magnet having a first electrical plating surface is supported within the base. A cover magnet is supported within the cover so as to move with the cover relative to the base. The cover magnet interacts with the base magnet to bias the cover towards at least one of the closed position and the open position. Furthermore, the cover magnet has a second electrical plating surface electrically connected to the first electrical plating surface to operatively connect the input panel to the display.

The first electrical plating surface and the second electrical plating surface may be in direct contact with one another.

The electronic mobile device may further comprise a pin pivotally connecting the base and the cover.

The base magnet may have a first magnetic axis, and the cover magnet may have a second magnetic axis. Interaction of the base magnet and the cover magnet may tend to align the first magnetic axis and the second magnetic axis. In the closed position the first magnetic axis may be misaligned with the second magnetic axis. In the open position the first magnetic axis may be aligned with the second magnetic axis.

Figure 2:
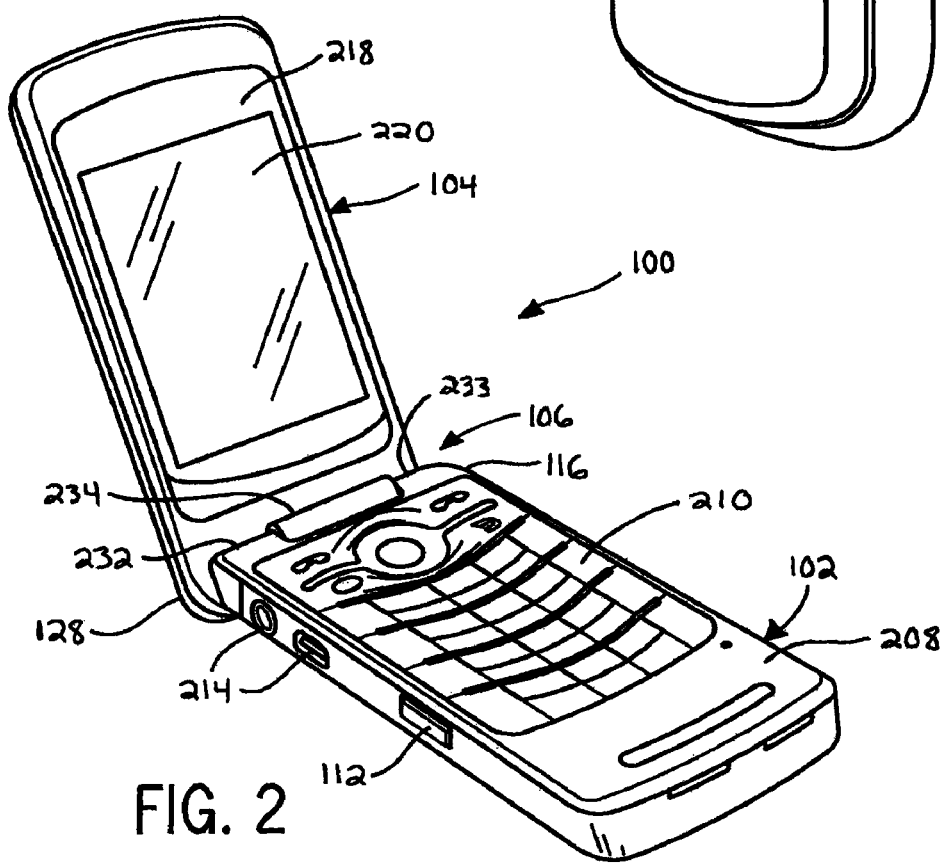
FIG. 2 is a perspective view of the electronic mobile device of FIG. 1 in an open position.
Figure 3:
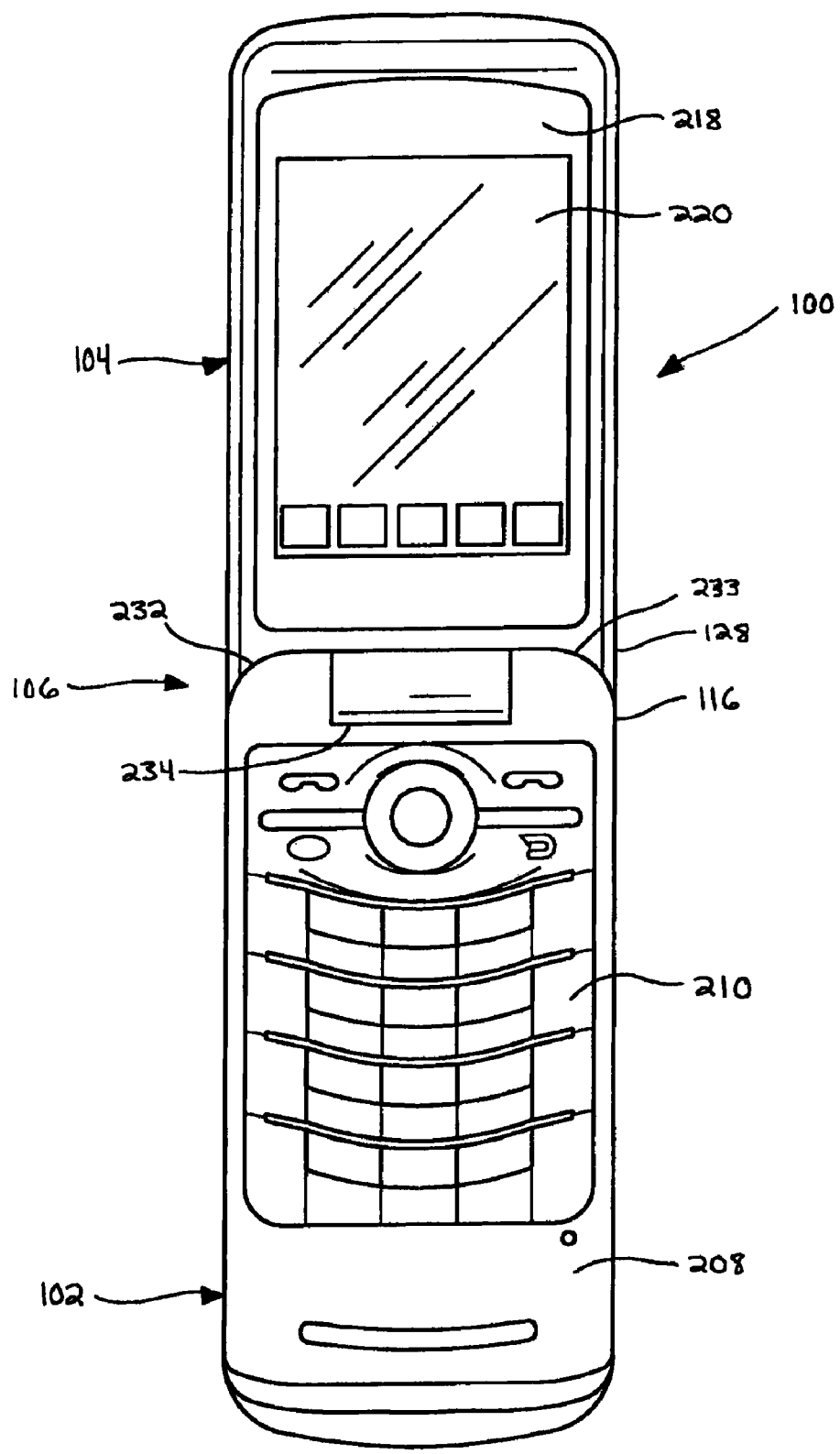
FIG. 3 is a top view of the electronic mobile device of FIG. 1 in the open position.
Figure 5:
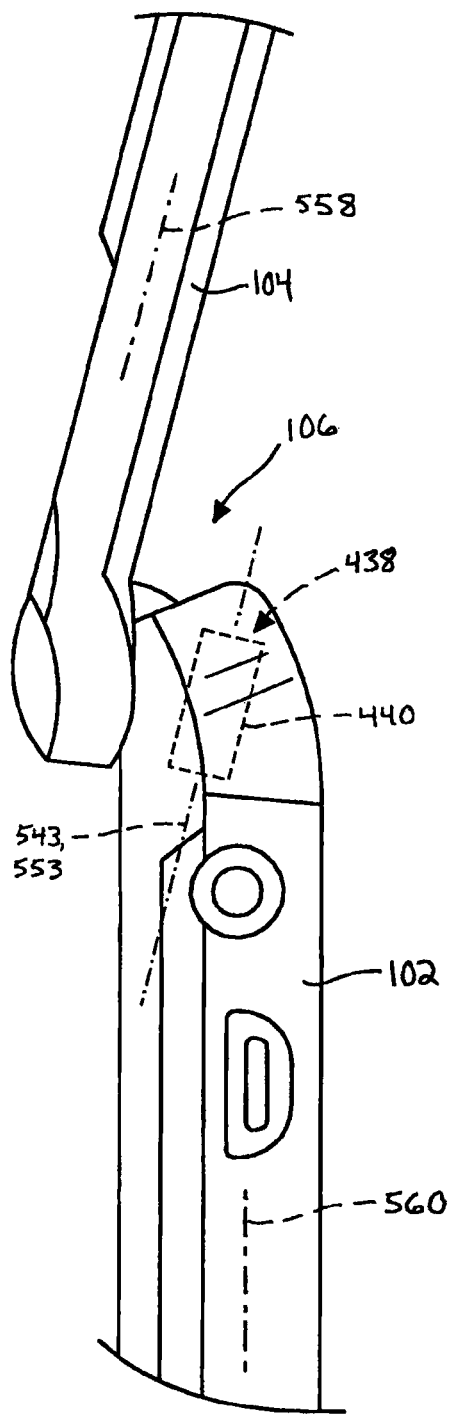
FIG. 5 is a side detail view of the hinge of FIG. 4 in the open position.
Figure 6:
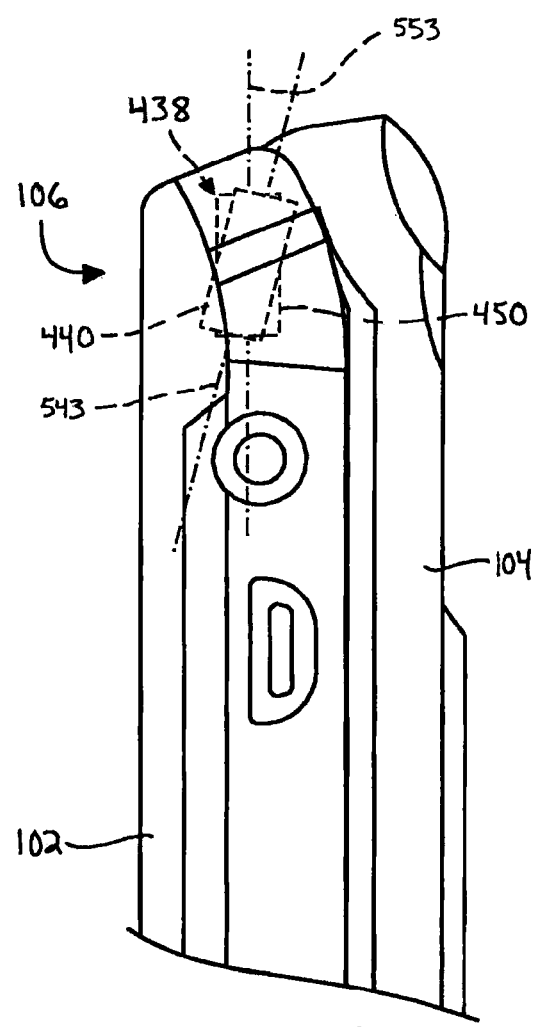
FIG. 6 is a side detail view of the hinge of FIG. 4 in the closed position.
Figure 7:
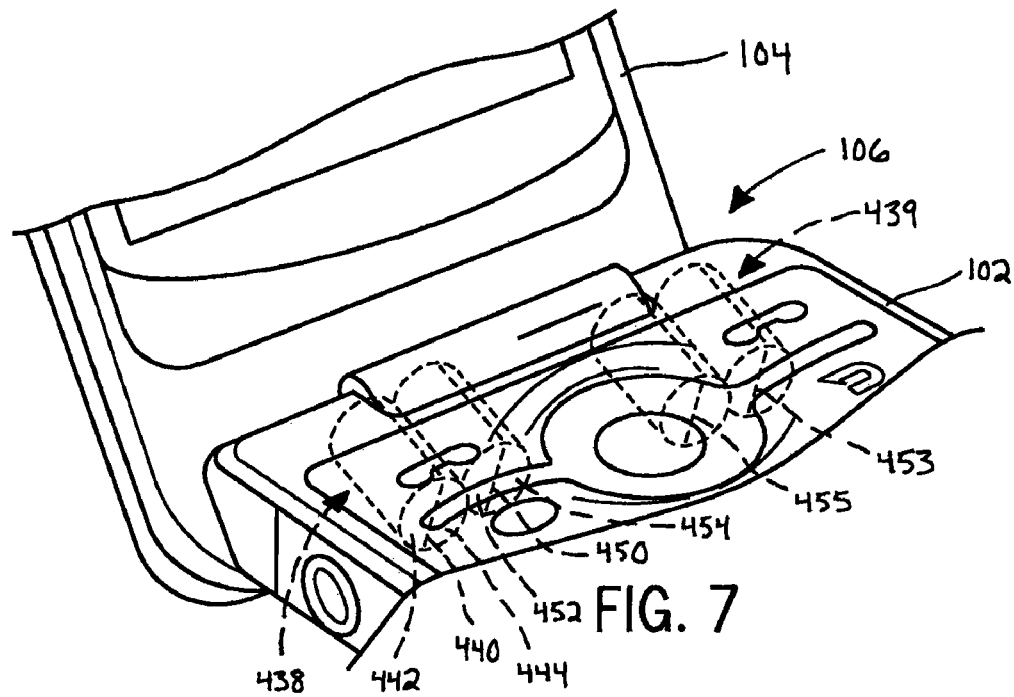
FIG. 7 is a perspective view of the electronic mobile device of FIG. 1 in the open position illustrating internal magnets within the hinge.
Figure 8:
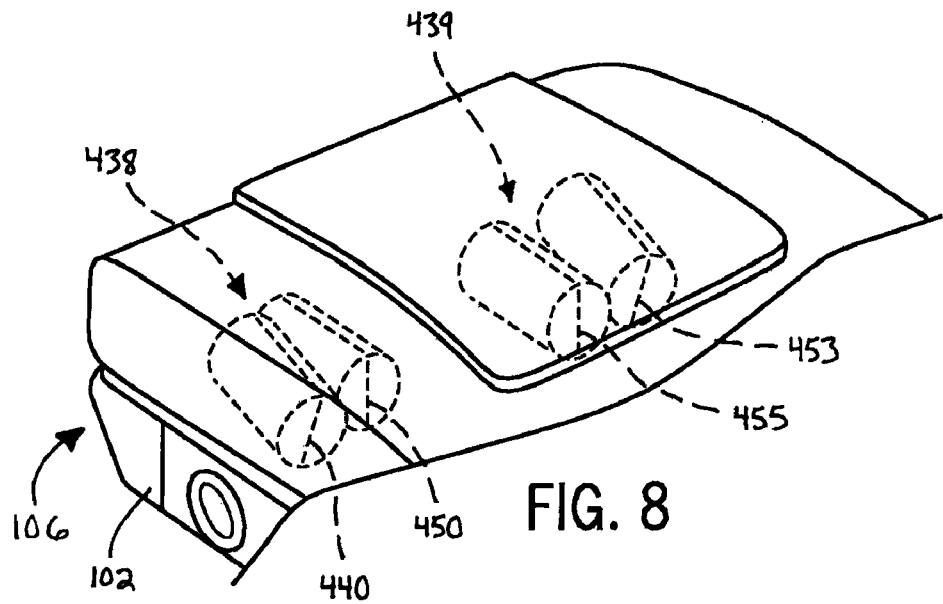
FIG. 8 is a perspective view of the electronic mobile device of FIG. 1 in the closed position illustrating the internal magnets within the hinge.

Referring now to the drawings wherein like reference numerals correspond to similar elements throughout the several views, the present disclosure will be described in the context of an electronic mobile device 100 such as a cellular phone, although the present disclosure is also applicable to other devices such as PDAs, notebook computers, and the like. Referring specifically to FIGS. 1-3, the electronic mobile device 100 includes a base 102 that supports a cover 104 via a hinge 106.

The base 102 has an inner surface 208 that supports an input panel 210, such as a keypad, a combination of a keypad and a trackball, a touch-sensitive panel, or the like. The sides of the base 102 also include additional keys 112 and data/power ports 214. In some embodiments, the base 102 includes a back plate (not shown) that may be removed to access a battery (not shown) and a removable memory card (not shown). Furthermore, the base 102 houses a microprocessor (not shown) that operatively connects to the input panel 210. The base 102 includes a hinge end 116 that pivotally supports the cover 104.

The cover 104 pivots between a closed position (FIG. 1) and an open position (FIGS. 2 and 3) relative to the base 102. In the closed position the cover 104 is disposed proximate the base 102, e.g., to protect the input panel 210 from unintentional activation due to accidental contact. In the open position the cover 104 is disposed away from the base 102, e.g., to permit use of the input panel 210. An inner surface 218 of the cover 104 supports an inner display 220 and an outer surface 122 supports an outer display 124 and a camera lens 126, each of which operatively connect to the microprocessor and the input panel 210.

Referring to FIGS. 1-4, the cover 104 includes a hinge end 128 that pivotally engages the hinge end 116 of the base 102. Together the hinge ends 116 and 128 of the base 102 and the cover 104 define the hinge 106. The hinge 106 includes first and second base hinge knuckles 232 and 233 fixedly supported by the base 102. The base hinge knuckles 232 and 233 are disposed on opposite sides of a cover hinge sleeve or knuckle 234 fixedly supported by the cover 104. The cover hinge knuckle 234 pivots about a hinge axis 436 relative to the base hinge knuckles 232 and 233, and the cover 104 thereby pivots about the hinge axis 436 relative to the base 102.

Referring now to FIGS. 4-8 and 17, the hinge 106 houses two magnet pairs 438 and 439. The first magnet pair 438 includes a first magnet 440 fixedly disposed within the first base hinge knuckle 232 (i.e., the first magnet pair 438 includes a "base" magnet 440). The base magnet 440 is a diametric magnet. As used herein, the phrase "diametric magnet" and variations thereof refers to a magnet that includes a polarity plane 441 (FIG. 17) separating a north pole half 442 from a south pole half 444. A diametric magnet also includes an attraction plane 543 (FIG. 17) perpendicular to the polarity plane 441. In the case of the electronic mobile device 100, two adjacent diametric magnets tend to pivot about the hinge axis 436 relative to one another to align the attraction planes 543. As such, two adjacent diametric magnets also tend to pivot relative to one another to align magnetic axes, such as the first magnetic axis 446 (FIG. 17) of the base magnet 440 defined by the intersection of the polarity plane 441 and the attraction plane 543 (of course, when describing the magnetic axes of diametric magnets, the term "aligned" means the axes extend in the same direction but are not collinear; i.e., the axes extend in the same direction and are spaced apart from one another). Furthermore, a diametric magnet may have generally cylindrical shape as shown in the figures, although other shapes may also be used. For example, three dimensional rectangular diametric magnets may also be used.

The first magnet pair 438 further includes a second magnet 450 fixedly disposed within the cover hinge knuckle 234 (i.e., the first magnet pair 438 includes a "cover" magnet 450). The cover magnet 450 is a diametric magnet like the base magnet 440. That is, the cover magnet 450 has a north pole half 452 and a south pole half 454 on opposite sides of a polarity plane 451. The polarity plane 451 and an attraction plane 553 also define a second magnetic axis 456. The cover magnet 450 is oriented such that the magnets 440 and 450 attract one another (e.g., the south pole half 444 of the base magnet 440 is disposed proximate the north pole half 452 of the cover magnet 450, although the north pole half 442 of the base magnet 440 could also be disposed proximate the south pole half 454 of the cover magnet 450).

The second magnet pair 439 is generally identical to the first magnet pair 438, and therefore the second magnet pair 439 is only briefly described. The second magnet pair 439 includes a third magnet 453 fixedly disposed within the second base hinge knuckle 233 (i.e., the second magnet pair 439 includes a second "base" magnet 453). The second magnet pair 439 also includes a fourth magnet 455 fixedly disposed within the cover hinge knuckle 234 (i.e., the second magnet pair 439 also includes a second "cover" magnet 455). The third magnet 453 and the fourth magnet 455 are diametric magnets and include a third magnetic axis 457 and a fourth magnetic axis 459, respectively. As such, the third magnet 453 and the fourth magnet 455 tend to pivot relative to one another to align the magnetic axes 457 and 459. Magnetic engagement of the third magnet 453 and the fourth magnet 455 (i.e., the interaction of the magnetic fields of the third magnet 453 and the fourth magnet 455 that provide the tendency for the magnets 453 and 455 to pivot relative to one another to align the magnetic axes 457 and 459) also provides a tendency for the cover 104 to pivot relative to the base 102 as described in the following paragraphs, although only the first magnet 440 and the second magnet 450 are described for simplicity.

As described briefly above, magnetic engagement between the magnets 440 and 450 provides a tendency for the magnets 440 and 450 to pivot towards alignment of the attraction planes 543 and 553 and the magnetic axes 446 and 456 (i.e., the attraction planes 543 and 553 being generally parallel). Therefore, magnetic engagement also provides a tendency for the cover 104 to pivot relative to the base 102 when the magnetic axes are misaligned. The magnets 440 and 450 bias the cover 104 towards the closed position or the open position when the magnetic axes are misaligned. The cover 104 occupies a stable position relative to the base 102 when the magnetic axes are aligned in the open position. In contrast and as described in further detail below, contact between the base 102 and the cover 104 prevents the magnetic axes from aligning in the closed position. Of course, a user may overcome the torque applied by the magnets 440 and 450 to pivot the cover 104 to a different desired position.

The cover magnet 450 is oriented such that the attraction plane 553 is generally parallel to a longitudinal plane 558 of the cover 104. The base magnet 440 is oriented such that the attraction plane 543 is offset from a longitudinal plane 560 of the base 102 by a small angle (e.g., between 5 and 20 degrees and advantageously about 15 degrees). The angle between the attraction plane 543 and the base longitudinal plane 560 provides the same angle between the base and cover planes 560 and 558 when the attraction planes 543 and 553 align in the open position (FIG. 5); the angle between the base 102 and the cover 104 is appropriate for positioning the device 100 proximate a user's ear and mouth during a phone call.

Furthermore, the orientation of the magnets 440 and 450 relative to the respective planes 560 and 558 (i.e., being offset by a small angle and parallel, respectively) advantageously provides a thinner hinge profile compared to previous designs. As such, the overall height of the device 100 is advantageously less than that of many previous flip-type designs.

As described briefly above, the attraction planes 543 and 553 are parallel in the open position, thereby providing a "virtual hinge detent" (i.e., a stable position of the cover 104 relative to the base 102). The attraction planes 543 and 553 are misaligned in the closed position (FIG. 6) due to the angle between the attraction plane 543 and the plane 560 described above. That is, contact between the base 102 and the cover 104 in the closed position prevents the attraction planes 543 and 553 from aligning.

The cover 104 moves over a total pivotal range of about 165 degrees between the closed position and the open position when the angle between the attraction plane 543 and the base plane 560 is 15 degrees. In the embodiment where the angle is 15 degrees, the magnets 440 and 450 bias the cover 104 towards the closed position over a first pivotal range from an angle of zero degrees to just less than 75 degrees of the cover plane 558 to the base plane 560. The magnets 440 and 450 bias the cover 104 towards the open position over the final 90 degrees of the total pivotal range (i.e., over a second pivotal range from an angle of just greater than 75 degrees to 165 degrees of the cover plane 558 to the base plane 560). Of course, the magnetic axes 446 and 456 of the magnets 440 and 450 are aligned at an angle of 165 degrees of the cover plane 558 to the base plane 560 (i.e., the open position), and the magnetic axes 446 and 456 are misaligned for all other angles within the total pivotal range.

Referring specifically to FIG. 4, in at least some embodiments a first hinge pin 462 extends through the first and second magnets 440 and 450 and pivotally connects the base 102 and the cover 104 about the hinge axis 436. Similarly, a second hinge pin 463 extends through the third and fourth magnets 453 and 455 and pivotally connects the base 102 and the cover 104 about the hinge axis 436. The hinge pins 462 and 463 may house cables or wires (not shown) that operatively connect the electronic components of the device 100 (e.g., connecting the input panel 210, the battery, and the microprocessor to the displays 124 and 220). In some embodiments, the wires housed by the hinge pins 462 and 463 carry power with an encoded data signal between the base 102 and the cover 104.

The structure of the electronic mobile device described above may vary without departing from the scope of the disclosure. For example, in some embodiments the base 102 supports a different type or number of input panels or keys than those described above and as shown in the figures. Similarly, in some embodiments the cover 104 supports different combinations of displays and/or camera lenses, or the cover 104 may include none of these components. That is, in some embodiments the cover 104 is a non-electronic component that simply secures the input panel 210 in the closed position and the display may be provided in the base.

As yet another example and referring now to FIG. 9, in some embodiments the hinge 106 does not include hinge pins or any other components extending through and mechanically securing the hinge knuckles 232, 234 and 233, 234. As such, the hinge knuckles 232, 234 and 233, 234 releasably engage one another and permit the cover 104 to detach from the base 102 in one or more positions (e.g., the open position).

Furthermore, the cover 104 and the base 102 house first and second wireless transceivers 964 and 965, respectively, that may communicate with each other to operatively connect the electronic components of the device 100. Such wireless transceivers 964 and 965 may also be employed in embodiments in which the hinge 106 includes hinge pins 462.

As yet another example and referring now to FIG. 10, in some embodiments the hinge 106 includes several interdigitating knuckles. That is, each of the base hinge knuckles 232 and 233 is disposed between the first cover hinge knuckle 234 and one of second and third cover hinge knuckles 1066 and 1067. Furthermore, a first short hinge pin 1068 pivotally connects the second cover hinge knuckle 1066 to the first base hinge knuckle 232. Similarly, a second short hinge pin 1069 pivotally connects the third cover hinge knuckle 1067 to the second base hinge knuckle 233. Unlike the embodiments described above, however, the hinge pins 1068 and 1069 do not extend through the magnets 440, 450, 453, and 455 or operatively connect the electronic components of the device 100. Instead, the magnets 440 and 450 are disposed in open recesses in the knuckles 232 and 234 and have electrically conductive outer surfaces or first and second electrical plating surfaces 1071 and 1073, respectively, (e.g., gold-plated surfaces) in contact with one another to operatively connect the electronic components. In some embodiments, such a conductive plating may be limited to a pivot point about which the magnets 440 and 450 rotate relative to one another (i.e., the contact point of the magnets 440 and 450 along the hinge axis 436). Of course, the magnets 453 and 455 may also have electrically conductive outer surfaces.

While the embodiments described above include two magnet pairs 438, in some embodiments a different number of magnets may suffice. Referring now to FIG. 11, in some embodiments the first and third base magnets 440 and 453 are disposed on opposite sides of a single cover magnet 450 (i.e., the second magnet). The cover magnet 450 may have an elongated or elliptical shape to permit a smaller cover hinge knuckle 234 structure compared to that of a large cylindrical cover magnet. In either case, each of the base magnets 440 and 453 magnetically engage the cover magnet 450 to bias the cover 104 toward the open and closed positions. That is, magnetic engagement between the magnets 440, 450, and 453 provides a tendency for the magnets 440, 450, and 453 to pivot towards alignment of the magnetic axes 446 and 457 with the second magnetic axis 456. Therefore, magnetic engagement also provides a tendency for the cover 104 to pivot relative to the base 102 when the magnetic axes 446 and 457 are misaligned with the second magnetic axis 456. The magnets 440, 450, and 453 bias the cover 104 towards the closed position and the open position, although a user may overcome the torque applied by the magnets 440, 450, and 453 to pivot the cover 104 to a different desired position.

Referring to FIG. 12, in some embodiments the hinge 106 includes only a single magnet pair 438 housed within a single pair of hinge knuckles 232 and 234. The base magnet 440 (i.e., the first magnet) magnetically engages the cover magnet 450 (i.e., the second magnet) to bias the cover 104 toward the open and closed positions. That is, magnetic engagement between the magnets 440 and 450 provides a tendency for the magnets 440 and 450 to pivot towards alignment of the attraction planes 543 and 553 and the magnetic axes 446 and 456 (i.e., the attraction planes 543 and 553 being generally parallel). Therefore, magnetic engagement also provides a tendency for the cover 104 to pivot relative to the base 102 when the magnetic axes 446 and 456 are misaligned. The magnets 440 and 450 bias the cover 104 towards the closed position and the open position, although a user may overcome the torque applied by the magnets 440 and 450 to pivot the cover 104 to a different desired position.

Figure 14:
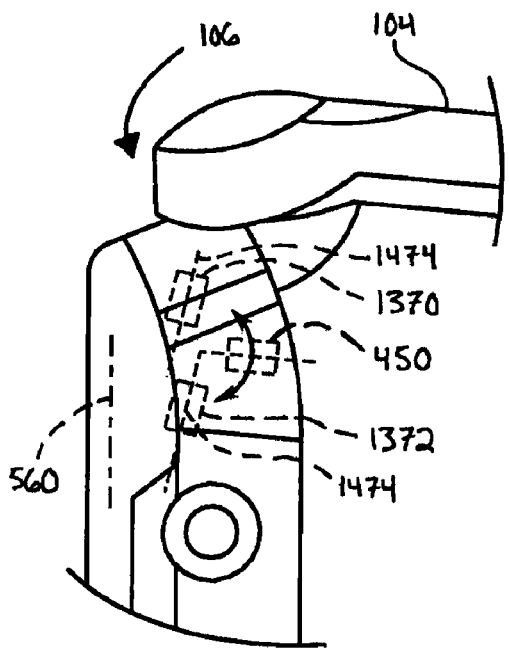
FIG. 14 is a side detail view of the hinge of FIG. 13 between an open and a closed position.

Referring now to FIGS. 13 and 14, in some embodiments the base hinge knuckles 232 and 233 each house a small upper base magnet 1370 (i.e., the first magnet) and a small lower base magnet 1372 (i.e., the third magnet) disposed on opposite sides of the hinge axis 436. The cover hinge knuckle 234 houses a single cover magnet 450 (i.e., the second magnet) that may have an elongated or elliptical shape as described above. The cover magnet 450 is also offset from the hinge axis 436 such the cover magnet 450 pivots between magnetic engagement with the pairs of upper base magnets 1370 and the lower base magnets 1372. That is, in the open position (FIG. 13), the cover magnet 450 is disposed between and magnetically engaged by the upper base magnets 1370. In the closed position, the cover magnet 450 is disposed between and magnetically engaged by the lower base magnets 1372. Attraction planes 1474 of the base magnets 1370 and 1372 may be misaligned with the longitudinal plane 560 of the base 102 as described above, although other orientations are also possible. In either case, magnetic engagement biases the cover 104 toward the open and closed positions.

Figure 16:
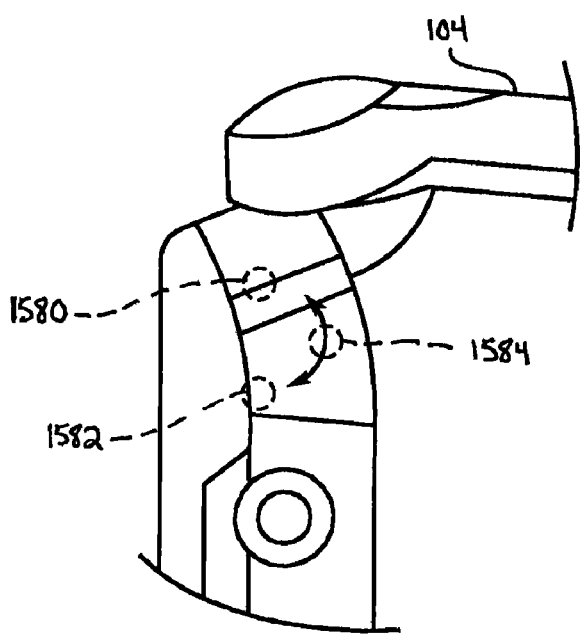
FIG. 16 is a side detail view of the hinge of FIG. 15 between an open and a closed position.
Figure 15:
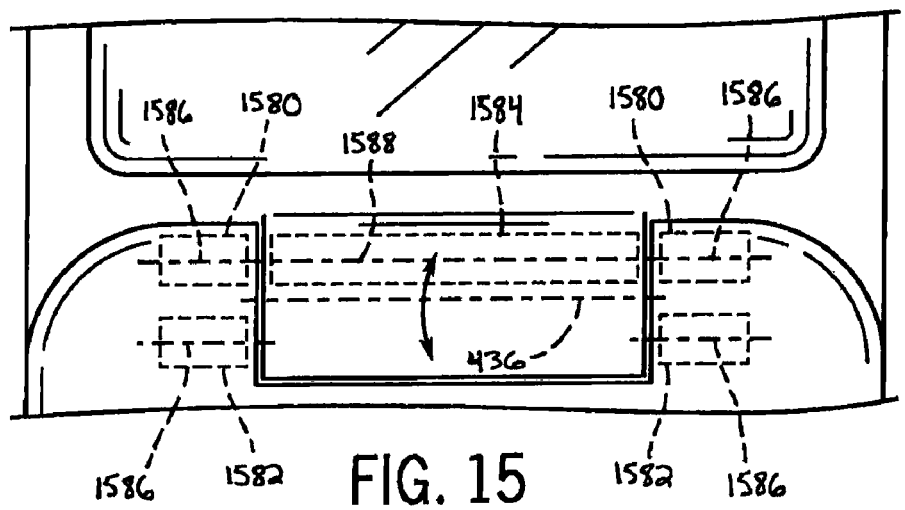
FIG. 15 is a top detail view of a seventh embodiment of the hinge of the electronic mobile device.
Figure 17:
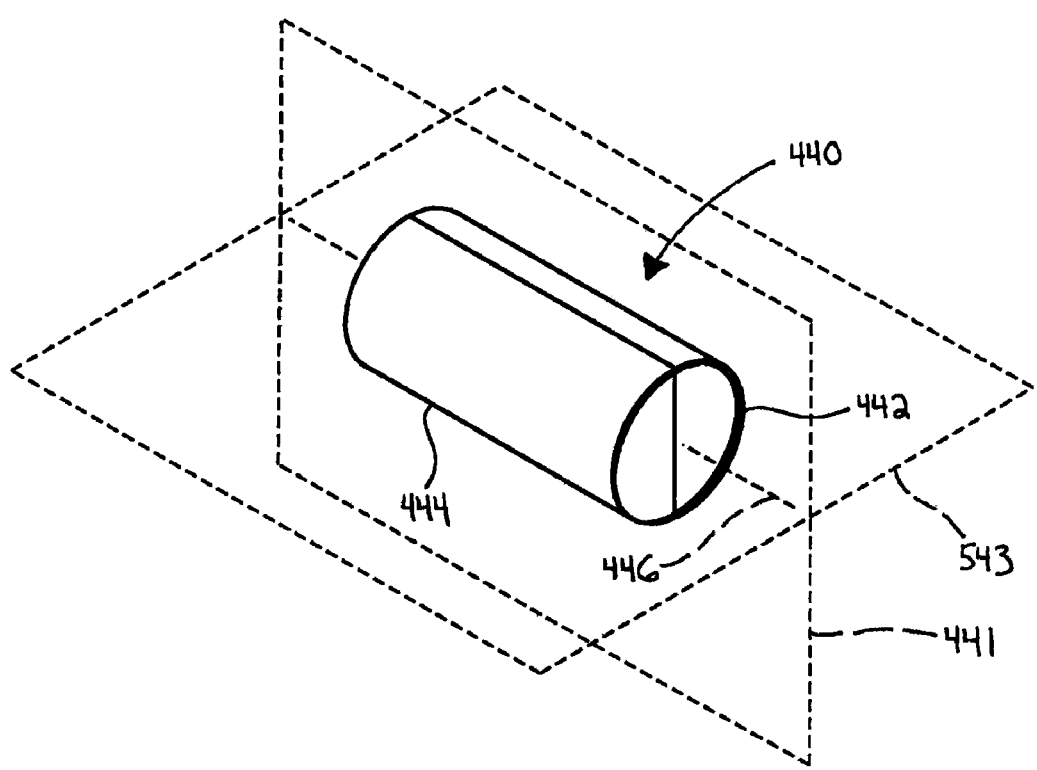
FIG. 17 is a perspective view of a diametric magnet illustrating polarity and attraction planes.

Referring to FIGS. 15 and 16, in some embodiments the upper base magnets 1580 (i.e., the first magnets), the lower base magnets 1582 (i.e., the third magnets), and the cover magnet 1584 (i.e., the second magnet) may be oriented such that magnetic axes 1586 and 1588 are generally parallel to the hinge axis 436. That is, the magnets 1580, 1582, and 1584 may be non-diametric magnets (e.g., axially polarized disc magnets having a polarity plane extending circumferentially through the magnets). As used herein in the context of non-diametric magnets, the term "magnetic axis" and variations thereof refers to an axis perpendicular to the polarity plane, typically extending through the center of the magnet, along which a pair of magnets tends to align.

The magnetic axes 1586 of the upper base magnets 1580 are aligned and collinear with the magnetic axis 1588 of the cover magnet 1584 in the open position. The magnetic axes 1586 of the lower base magnets 1582 are aligned and offset from the magnetic axis 1588 of the cover magnet 1584 in the closed position. Alternatively, the magnetic axes 1586 of the lower base magnets 1582 and the magnetic axis 1588 of the cover magnet 1584 may be collinear in the closed position. In either case, magnetic engagement biases the cover 104 toward the open and closed positions.

Of course, in many of the embodiments described above the number of base hinge knuckles 232 and 233 and cover hinge knuckles 234 may be reversed. That is, for example, the cover 104 may include two hinge knuckles disposed on opposite sides of a single base hinge knuckle.

From the above description, it should be apparent that the present disclosure provides an electronic mobile device hinge having a thinner profile than previous designs. Furthermore, components of the hinge do not deform with repeated use or provide a decreasing biasing force over the life of the device.

It should be appreciated that various other modifications and variations to the preferred embodiments can be made within the spirit and scope of the disclosure. Therefore, the disclosure should not be limited to the described embodiments. To ascertain the full scope of the disclosure, the following claims should be referenced.

What is claimed is:

1. An electronic mobile device, comprising:
   a base forming an inner surface and having a base hinge end;
   a cover having a cover hinge end engaged with the base hinge end, the cover pivotable about a hinge axis that is substantially parallel to the inner surface of the base, the cover movable from a closed position to an open position and vice versa relative to the base, in the closed position the cover disposed proximate the base, and in the open position the cover disposed away from the base;
   a base magnet supported at the base hinge end, the base magnet having a first magnetic axis;
   a cover magnet supported at the cover hinge end so as to move with the cover relative to the base, the cover magnet interacting with the base magnet and having a second magnetic axis; and
   wherein interaction between the base magnet and the cover magnet tends to align the first magnetic axis and the second magnetic axis and thereby bias the cover towards at least one of the closed position and the open position.

2. The electronic mobile device of claim 1, wherein the cover is movable over a pivotal range between the open position and the closed position in which the first magnetic axis and the second magnetic axis are misaligned.

3. The electronic mobile device of claim 2, wherein in the closed position the first magnetic axis is misaligned with the second magnetic axis, and in the open position the first magnetic axis is aligned with the second magnetic axis.

4. The electronic mobile device of claim 1, wherein the cover is detachable from the base in the open position.

5. The electronic mobile device of claim 1, wherein the base magnet is a diametric magnet including:
   a north pole half;
   a south pole half;
   a polarity plane separating the north pole half and the south pole half; and
   an attraction plane perpendicular to the polarity plane, an intersection of the polarity plane and the attraction plane defining the first magnetic axis.

6. The electronic mobile device of claim 1, wherein the base magnet and the cover magnet are diametric magnets, each of the diametric magnets including:
   a north pole half;
   a south pole half;
   a polarity plane separating the north pole half and the south pole half;
   an attraction plane perpendicular to the polarity plane; and
   wherein interaction between the base magnet and the cover magnet tends to align the attraction planes and thereby bias the cover towards the at least one of the closed position and the open position.

7. The electronic mobile device of claim 1, further comprising:
   a second base magnet supported at the base hinge end, the second base magnet having a third magnetic axis;
   a second cover magnet supported at the cover hinge end so as to move with the cover relative to the base, the second cover magnet interacting with the second base magnet and having a fourth magnetic axis; and
   wherein interaction between the second base magnet and the second cover magnet tends to align the third magnetic axis and the fourth magnetic axis and thereby bias the cover towards the at least one of the closed position and the open position.

8. The electronic mobile device of claim 1, further comprising:
   a second base magnet supported at the base hinge end, the second base magnet having a third magnetic axis; and
   wherein interaction between the second base magnet and the cover magnet tends to align the second magnetic axis and the third magnetic axis and thereby bias the cover towards the at least one of the closed position and the open position.

9. An electronic mobile device, comprising:
a base forming an inner surface;
a cover pivotable about a hinge axis that is substantially parallel to the inner surface of the base, the cover being movable from a closed position to an open position and vice versa relative to the base, in the closed position the cover being disposed proximate the base, and in the open position the cover being disposed away from the base;
a hinge including:
   a first base hinge knuckle fixedly supported by the base;
   a first magnet housed within the first base hinge knuckle, the first magnet having a first magnetic axis;
   a first cover hinge knuckle fixedly supported by the cover proximate the first base hinge knuckle;
   a second magnet housed within the first cover hinge knuckle so as to move together with the cover relative to the base, the second magnet having a second magnetic axis; and
   wherein the first magnet and the second magnet interact to provide a tendency to align the first magnetic axis and the second magnetic axis and thereby bias the cover towards at least one of the closed position and the open position.

10. The electronic mobile device of claim 9, wherein the hinge further includes:
a second base hinge knuckle fixedly supported by the base;
a third magnet housed within the second base hinge knuckle, the third magnet having a third magnetic axis;
a second cover hinge knuckle fixedly supported by the cover proximate the second base hinge knuckle;
a fourth magnet housed within the second cover hinge knuckle so as to move together with the cover relative to the base, the fourth magnet having a fourth magnetic axis, and the fourth magnet and the third magnet interacting to provide a tendency to align the fourth magnetic axis and the third magnetic axis and thereby bias the cover towards the at least one of the closed position and the open position;
a first hinge pin pivotally connecting the first base hinge knuckle and the first cover hinge knuckle; and
a second hinge pin pivotally connecting the second base hinge knuckle and the second cover hinge knuckle.

11. The electronic mobile device of claim 9, wherein the cover is movable over a first pivotal range and a second pivotal range, when pivoted to a position in the first pivotal range the first magnet and the second magnet bias the cover towards the closed position, and when pivoted to a position in the second pivotal range the first magnet and the second magnet bias the cover towards the open position.

12. The electronic mobile device of claim 9, wherein the base has a base longitudinal plane and the cover has a cover longitudinal plane, the first magnetic axis is misaligned relative to the base longitudinal plane in both the open position and the closed position, and the second magnetic axis is generally parallel relative to the cover longitudinal plane in both the open position and the closed position.

13. The electronic mobile device of claim 9, further comprising:
an input panel supported by the base;
a display supported by the cover;
a first wireless transceiver supported within the cover; and
a second wireless transceiver supported within the base, the second wireless transceiver and the first wireless transceiver communicating to operatively connect the input panel to the display.

14. The electronic mobile device of claim 9, wherein the hinge further includes:
a second base hinge knuckle fixedly supported by the base, the first base hinge knuckle and the second base hinge knuckle being disposed on opposite sides of the first cover hinge knuckle;
a third magnet housed within the second base hinge knuckle, the third magnet having a third magnetic axis;
a fourth magnet housed within the first cover hinge knuckle so as to move together with the cover relative to the base, the fourth magnet having a fourth magnetic axis; and
wherein the third magnet and the fourth magnet interact to provide a tendency to align the third magnetic axis and the fourth magnetic axis and thereby bias the cover towards the at least one of the closed position and the open position.

15. The electronic mobile device of claim 9, wherein the hinge further includes:
a third magnet housed within the first base hinge knuckle, the third magnet having a third magnetic axis;
wherein the second magnet and the third magnet interact to provide a tendency to align the second magnetic axis and the third magnetic axis and thereby bias the cover towards the other of the closed position and the open position.

16. The electronic mobile device of claim 9, further comprising an input panel supported by the base and a display supported by the cover, wherein the first magnet includes a first electrical plating surface, and the second magnet includes a second electrical plating surface electrically connected to the first electrical plating surface to operatively connect the input panel to the display.

17. An electronic mobile device, comprising:
a base;
an input panel supported by the base;
a cover being pivotable from a closed position to an open position and vice versa relative to the base, in the closed position the cover covering the input panel, and in the open position the cover being disposed away from the base;
a display supported by the cover;
a base magnet supported within the base, the base magnet having a first electrical plating surface; and
a cover magnet supported within the cover so as to move with the cover relative to the base, the cover magnet interacting with the base magnet to bias the cover towards at least one of the closed position and the open position, and the cover magnet having a second electrical plating surface electrically connected to the first electrical plating surface to operatively connect the input panel to the display.

18. The electronic mobile device of claim 17, wherein the first electrical plating surface and the second electrical plating surface are in direct contact with one another.

19. The electronic mobile device of claim 17, further comprising a pin pivotally connecting the base and the cover.

20. The electronic mobile device of claim 17, wherein the base magnet has a first magnetic axis, the cover magnet has a second magnetic axis, interaction of the base magnet and the cover magnet tends to align the first magnetic axis and the second magnetic axis, in the closed position the first magnetic axis is misaligned with the second magnetic axis, and in the open position the first magnetic axis is aligned with the second magnetic axis.

* * * * *

UNITED STATES PATENT AND TRADEMARK OFFICE
CERTIFICATE OF CORRECTION

PATENT NO. : 8,159,834 B2  
APPLICATION NO. : 12/623003  
DATED : April 17, 2012  
INVENTOR(S) : Griffin et al.

Page 1 of 1

It is certified that error appears in the above-identified patent and that said Letters Patent is hereby corrected as shown below:

Title Page Item (73), Assignee "Research in Motion Ltd." should be --Research In Motion Limited--

Signed and Sealed this  
Sixth Day of November, 2012

David J. Kappos  
*Director of the United States Patent and Trademark Office*